Patented Jan. 6, 1948

2,434,146

UNITED STATES PATENT OFFICE 2,434,146

OPTICAL GLASS

Paul F. De Paolis, Rochester, N. Y., assignor to Eastman Kodak Company, Rochester, N. Y., a corporation of New Jersey No Drawing. Application August 4, 1945, Serial No. 609,021

5 Claims. (Cl. 106—54)

This application relates to glass having optical values in a range that is useful for the designing of optical instruments. Specifically, this application relates to such glass having an index of refraction for the D line ($n_D$) of the order of 1.71 and an Abbe value ($\nu$) of the order of 53.

In general, the glasses herein described have a rather high content of boric oxide, present as a glassifier, although other glassifiers in small amount may be added, such as the oxides of aluminum or silicon. They also contain the oxides of thorium and lanthanum of the order of twenty per cent by weight of each, to which a small amount of other rare earth oxides, such as tantalum, may be added, the total being of the order of forty-five per cent; as well as the oxides of the divalent metals in an amount of the order of twenty per cent; in particular, barium oxide, for which strontium oxide may be largely substituted.

Two formulas illustrative of my invention are given, in the first of which, designated A, none of the substitutions suggested above are made, and the second of which is a formula illustrative of such variation, parts being by weight.

| Oxide of— | A | B |
|---|---|---|
| Boron | 33.4 | 35 |
| Aluminum | | 2 |
| Silicon | | 3 |
| Lanthanum | 22.2 | 23 |
| Thorium | 22.2 | 19 |
| Tantalum | | 2 |
| Barium | 22.2 | 8 |
| Strontium | | 8 |
| $n_D$ | 1.718 | 1.71 |
| $\nu$ | 53.5 | 53 |

It has been found that these ingredients in the range of proportions given are compatible to form a glass of good physical properties, such as transparency, weather resistance, and hardness, and having desirable optical characteristics. It takes a high optical polish and withstands the processes inherent in manufacturing, such as molding, sawing, grinding, annealing, cementing, and the like.

The glasses herein described are of the type generically covered by Reissue Patent 21,175, Morey, over which they are specific improvements.

While the patent disclosed the wide field within which useful glasses might be found, this field is not of uniform productiveness. The various oxides cannot be combined in all proportions to obtain equally useful glasses; nor are they all compatible in all proportions to make a glass without tendency to crystallize or devitrify. This application relates to a particular area of that field that has been found to have definite utility in the designing of lenses and optical instruments.

In the examples given, although the parts are precisely given, and these are preferred, it is to be understood that variations in these proportions and addition of other oxides in small quantities are contemplated, provided these changes are within the ranges and the resulting proportions are of the order of those given in the claims. Such changes will naturally result in variations in the optical properties. All such modifications, and equivalents I consider as within the scope of my invention.

Having thus described my invention, what I claim is:

1. An optical glass comprising the following oxides in the proportions by weight as given: boron, 32 to 37 per cent; aluminum, less than 3 per cent; lanthanum, 20 to 25 per cent; thorium, 18 to 25 per cent; divalent metals, at least 16 per cent.

2. An optical glass consisting of the oxides of the following elements in substantially the proportions by weight as given: boron, 33 parts; lanthanum, thorium, and barium, 22 parts of each.

3. An optical glass consisting of the oxides of the following elements in substantially the proportions by weight as given: boron, 35 parts; aluminum and silicon totaling 5 parts; lanthanum, 23 parts; thorium, 19 parts; tantalum, 2 parts; barium and strontium totaling 16 parts.

4. An optical glass composition comprising the following oxides in the proportions by weight as given: boron, over 30 per cent; aluminum, 0 to 3 per cent; silicon, 0 to 3 per cent; lanthanum, 20 to 25 per cent; thorium, 18 to 25 per cent; and divalent metals, at least 15 per cent.

5. An optical glass composition comprising the following oxides in the proportions by weight as given: boron, over 30 per cent; aluminum, 0 to 3 per cent; silicon, 0 to 3 per cent; the total of the above three oxides not exceeding 40 per cent; lanthanum, 20 to 25 per cent; thorium, 18 to 25 per cent; the total of lanthanum and thorium oxides being at least 40 per cent; and divalent metals at least 15 per cent, of which barium constitutes at least 7 per cent.

PAUL F. DE PAOLIS.

REFERENCES CITED

The following references are of record in the file of this patent:

UNITED STATES PATENTS

| Number | Name | Date |
|---|---|---|
| 2,241,249 | Eberlin | May 6, 1941 |